United States Patent [19]
Palmer

[11] 4,164,984
[45] Aug. 21, 1979

[54] GARDEN IMPLEMENT

[76] Inventor: Harold Palmer, Rt. 2, Box 221-FF, Orland, Calif. 95963

[21] Appl. No.: 892,683

[22] Filed: Apr. 3, 1978

Related U.S. Application Data

[63] Continuation-in-part of Ser. No. 757,919, Jan. 10, 1977, abandoned.

[51] Int. Cl.² ............................................. A01B 1/10
[52] U.S. Cl. .................................... 172/371; 403/241
[58] Field of Search ............... 172/371; 47/1; 30/276, 30/300, 305, 309, 310, 315, 318, 342; 294/50.5; 403/241, 290, 354; D8/7

[56] References Cited
U.S. PATENT DOCUMENTS

| | | | |
|---|---|---|---|
| 2,824,743 | 2/1958 | Humbry | 47/1 X |
| 2,935,817 | 5/1960 | Maines | 47/1 |
| 3,019,504 | 2/1962 | Castagliuolo | 403/290 X |

Primary Examiner—Richard T. Stouffer

[57] ABSTRACT

A garden implement including an elongate, manually engageable handle and a working head at one end of the handle; the head is Z-shaped and has straight laterally spaced parallel cutting blades, a straight central member extending diagonally between oppositely related ends of the blades and joined therewith at acute angles and guard plates at right angle to and extending laterally inwardly from the other ends of the blades; the head is established of thin, narrow strap steel, the opposite edges of which are sharpened to define oppositely disposed cutting edges which are disposed longitudinally with respect to the longitudinal axis of the implement. The implement further includes coupling structure to couple the one end of the handle with the diagonal member, at right angle to and intermediate the ends of that member.

9 Claims, 7 Drawing Figures

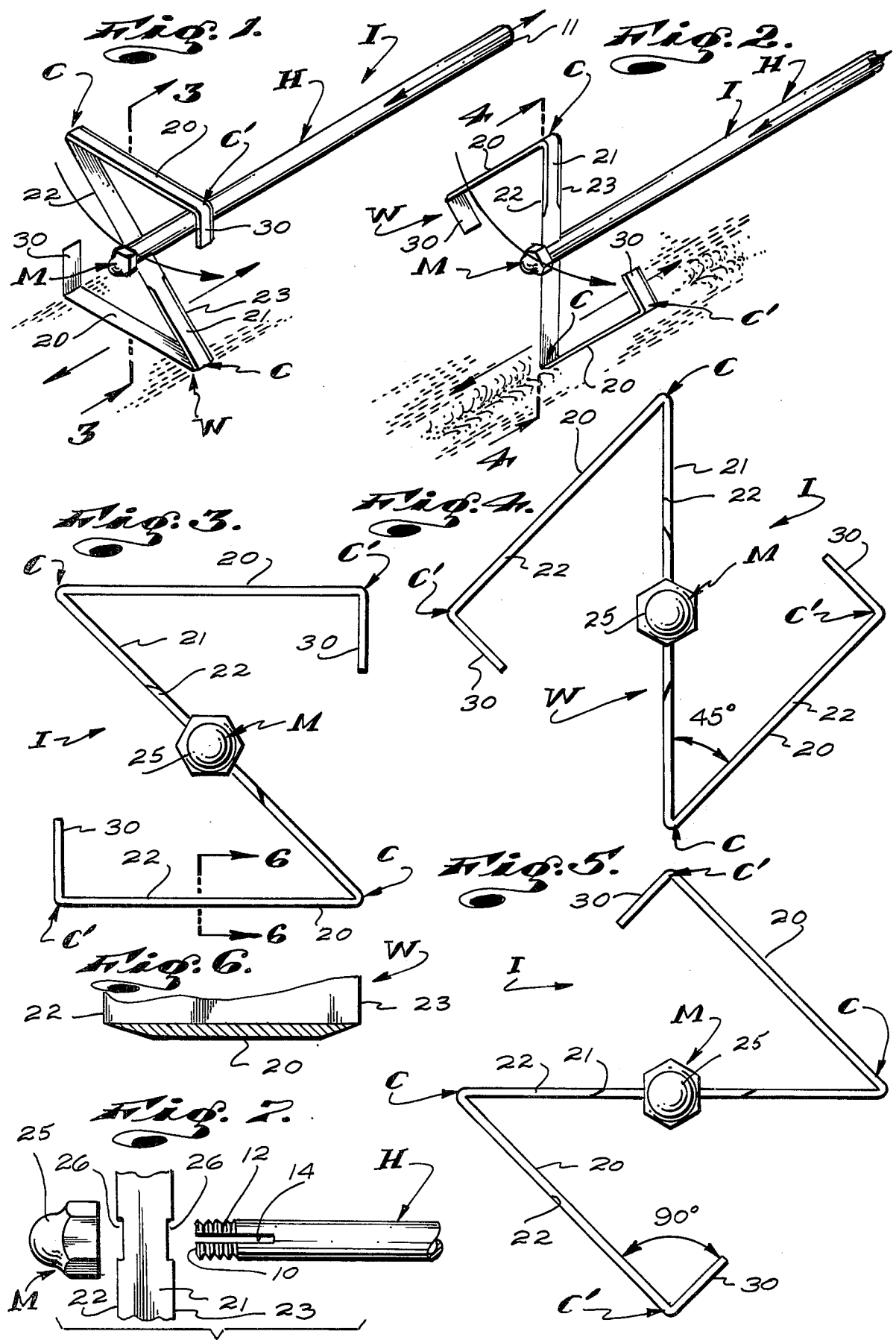

GARDEN IMPLEMENT

This is a continuation in part of my copending application for United States Letters Pat. Ser. No. 757,919, filed Jan. 10, 1977, now abandoned, for GARDEN IMPLEMENT.

PRIOR ART

The following patents are considered pertinent:
U.S. Pat. No. 1,466,168
U.S. Pat. No. 1,731,174
U.S. Pat. No. 1,771,353
U.S. Pat. No. 2,030,770
U.S. Pat. No. 2,824,743
U.S. Pat. No. 2,935,817
U.S. Pat. No. 3,019,504
U.S. Pat. No. 3,149,873
U.S. Pat. No. 3,680,641
U.S. Pat. No. 3,767,219.

BACKGROUND OF THE INVENTION

This invention relates to a garden tool or implement and is particularly concerned with a multi-purpose implement which is particularly suited for effectively performing work normally performed by separate, specialized tools or implements.

Conventional garden tools of the general class here concerned with include elongate manually engageable handles and working heads or blades secured to the ends of the handles. Such tools include hoes which are particularly suited for cutting weeds and the like. The working heads of hoes characteristically include flat plate-like blades on planes substantially normal to the axis of the tool handles and have a single straight cutting edge disposed normal to the axis of the handles. Hoes are such that they must be swung substantially downwardly in a single predetermined sweeping motion to chop weeds and are such that they cannot be effectively pushed or pulled into engagement with the stocks of weeds and the like to effect cutting the weeds.

Hoes are not intended or designed to cultivate or turn soil. When cultivating or turning the soil is sought to be performed, special cultivating tools are commonly employed. The prior art provides cultivating tools in many special forms. The most common cultivating tool is much like a hoe except that the plate-like blade is triangular in shape and has side edges which converge to define an earth-penetrating point. The points on such cultivating tools are disposed substantially laterally outwardly relative to the longitudinal axis of the handles so that upon swinging the tools downwardly in chopping motions, the points of the tools are driven into the earth for subsequent manipulation and turning of the soil.

Cultivators of the character referred to above are not suited for cutting weeds. Further, such tools are ordinarily such that while they might be effectively pulled or dragged through soft earth to turn or till the earth, they cannot effectively and efficiently turn or till the earth by pushing the tools.

When a person wishes to cut weeds, he uses one tool especially designed for that purpose. Should he also wish to cultivate or till the soil, he must have available and selectively use a suitable cultivating tool. Accordingly, when both weeding and cultivating operations are to be performed at the same time, it is normally required that the person have separate tools available for those different operations and that he continually switch or change tools as his work progresses.

The above procedure is extremely inconvenient and has resulted in a long-felt want and need for a single tool which is suitable and effective for both weeding and cultivating.

In working on and about many plants and in working or cultivating many sandy and readily friable soils, it would be most convenient to have a small compact tool which is such that the cutting of weeds and the turning or tilling of soil might be effectively performed by simply pushing and/or pulling the tool by its handle, substantially horizontally across and relative to the work. The clear or apparent need for such a tool is always apparent in those situations where close and careful work must be performed and where clearances about and access to the work site is such as to impede or prevent the use of common hoes and cultivators which must be swung up and down in chopping motions.

OBJECTS AND FEATURES OF THE INVENTION

It is an object and feature of my invention to provide a novel garden implement or tool which is particularly suited for both weeding and cultivating.

Another object and feature of my invention is to provide a tool of the general character referred to which is such that cutting of weeds and cultivating of soil is effected by axial shifting or reciprocating of the tool handle and resulting pushing or pulling of the working head of the tool into engagement with and through the weeds and/or soil worked upon.

SUMMARY OF THE INVENTION

The garden implement of the present invention includes an elongate manually engageable handle and a Z-shaped working head at one end of the handle. The Z-shaped head is established of a single length of flat strap steel and has straight laterally spaced parallel blades and a straight central member extending diagonally between oppositely related ends of the blades to join the legs at acute angles. The head further includes guard like plates at right angle to and extending laterally inwardly from the other ends of the blades. The plane of the blades, member and plates are parallel with the longitudinal axis of the handle and the opposite longitudinally forwardly and rearwardly disposed edges of the blades and portions of the edges of the member and the plates are beveled to establish oppositely disposed cutting edges.

The straight blades with forwardly and rearwardly disposed cutting edges are effective to cut weeds when pushed or pulled into engagement therewith. The end portions of the blades and their related end portions of the central member and the guard plates cooperate to define and/or establish V-shaped earth engaging cultivating or tilling corner portions on the head, at the ends of the blades. The V-shaped earth engaging or tilling portions defined by the blades and the central member, which converge at acute angle, are narrow and sharp corner portions while the V-shaped earth engaging or tilling corner portions defined by the blades and guard plates, which converge at wide angle, are wide or less sharp corner portions. The provision of earth engaging corner portions of different angle and width provides corner portions having different cutting or working characteristics which are particularly suited for most effective working and tilling of different soils or the working of soils under different conditions.

The guard plates at the ends of the blades serve as stops to engage the stocks of plants about which the tool is being worked and to prevent the blades from inadvertently moving into cutting engagement with the stocks of plants.

The implement next and finally includes coupling means coupling one end of the handle to the diagonal member of the head, at right angle to and intermediate the ends of said member.

BRIEF DESCRIPTION OF THE DRAWINGS

FIG. 1 is an isometric view of my garden implement;

FIG. 2 is a view similar to FIG. 1 showing the implement in a different disposition;

FIG. 3 is a view taken as indicated by line 3—3 of FIG. 1;

FIG. 4 is a view taken as indicated by line 4—4 of FIG. 2;

FIG. 5 is a view similar to FIGS. 3 and 4 showing the implement in another disposition;

FIG. 6 is a sectional view taken as indicated by line 6—6 on FIG. 3; and

FIG. 7 is an exploded view of the coupling means that I provide.

DETAILED DESCRIPTION OF THE PREFERRED EMBODIMENT

Referring to the drawings wherein like numerals indicate like elements throughout the several views, the garden implement I of the present invention includes a handle H, a working head W and coupling means M.

The handle H is an elongate cylindrical part having front and rear ends 10 and 11. The front end of the handle is externally threaded as at 12 and is slotted as at 14.

The handle is preferably established of a length of steel pipe.

The working head W is a substantially Z-shaped part established from a single length of flat strap steel. The head W has a pair of elongate, straight, laterally spaced and parallel blades 20 and an elongate straight central member 21 extending diagonally between the blades and joined integrally with oppositely related ends of the blades.

The plane of the head W is normal to the central longitudinal axis of the handle.

The flat plane of the strap establishing the head W is parallel with the central longitudinal axis of the handle H so that the blades 20 and member 21 have front and rear or axially forwardly and rearwardly disposed edges 22 and 23.

The central portion of the member 21 is normally slidably engaged in the slot 14 at the front end of the handle H and is retained therein by a pipe cap or acorn nut 25 threaded on and about the forward free end portion of the handle.

To prevent lateral shifting of the member 21 in the slot 14, the front and rear edges of the central portion of the member are notched as at 26. The notch 26 on the edge disposed rearwardly and toward the bottom of the slot 14 establishes keyed engagement with the handle adjacent to the rear end of the slot and prevents lateral shifting of the member relative to the handle.

By providing notches 26 in both edges of the member 21, the head W is made reversible, that is, it can be turned end for end and engaged with the handle, as desired, or as circumstances require.

The above noted notched central portion of the member 21, the threaded and slotted front end portion of the handle H and the cap or nut 25 go to make up the coupling means M that I provide.

The head W next includes straight elongate guard plates 30 at the free ends of the blades 20, that is, at the ends of the blades which are remote from those ends of the blades which join the member 21.

The plates 30 are integral extensions of the blades and extend laterally inwardly from the ends of the blades at right angle thereto. The plates 30 are of limited longitudinal extent and, like the blades 20 and member 21, have front and rear edges, which edges are simple extensions of the edges 22 and 23 of the blades and member.

The acutely converging end portions of the blades 20 and member 21 join to define a pair of sharp, narrow V-shaped cultivating corner portions C. The right angularly related, converging end portions of the blades 20 and the plates 30 join to define a pair of less sharp or dull and wide V-shaped cultivating corner portions C'.

The front and rear edges 22 and 23 of the blades 20 are beveled, as shown in FIG. 6 of the drawings, to provide or establish sharp cutting edges on the blades.

In the preferred carrying out of my invention, the front and rear edges 22 and 23 of the central member 21 and of the plates 30 are beveled and sharpened through, at least, the end portions thereof which define the cultivating or earth tilling corner portions C and C'.

It has been determined that in order to attain the maximum utility of my new implement, the blades 20, member 21 and plates 30 must be maintained as narrow (fore and aft) as is practical. As the width of the blades is increased, the tendency of the blades to plane across or sled over the earth and/or debris thereon, as the tool is moved relative thereto, increases at a rapid rate. The increased area of the sides of the blades affords proportionately greater lifting area upon which irregularities and objects on the earth's surface can work to prevent the blades from being lowered and urged into desired position relative to the surface of the earth. When the blades are too wide, they present a serious visual obstacle. Finally, when the blades are too wide, they prevent effective swinging of the tool, in a chopping action, when such action is desired.

It has been determined that 1⅛"×⅛" steel strap is ideally suited for establishing the head W. When such stock is employed, the blades 20, the member 21, and plates 30 are 1⅛" wide and the head W is imparted with desired structural stability and weight.

It has been determined and is demonstrable that when the width of the blades, member and plates is in excess of 2", the utility of the implement is materially adversely affected.

In use, the rear end portion of the handle H is gripped in the user's hand and is disposed to extend substantially horizontally and forwardly therefrom, or in spaced parallel relationship above the surface of the earth at the work site. The structure is rotated within the user's hand or is rotated by the user turning his wrist so that one or the other of the blades 20 is adjacent to and parallel with the surface of the earth, as shown in FIGS. 1 and 3 of the drawings, or so that one of the cultivating or tilling corner C or C' is disposed toward and engaged with the earth, as shown in FIGS. 2, 4 and 5 of the drawings.

When the structure is disposed as shown in FIGS. 1 and 3 of the drawings, the lower cutting blade 20 can be easily and conveniently moved forwardly and/or rearwardly to engage and cut the stocks of weeds and the like which project up from the surface of the earth. The blade 20 can also be used to shave and/or grade the surface of the earth. By raising and lowering the rear end of the handle, the cutting angle of the blade can be effectively varied for most effective working of the implement.

When the structure is disposed as shown in FIGS. 2 and 4 or 5 of the drawings, upon the application of suitable vertical pressure on the head, through the handle, lifting or lowering the rear end of the handle for desired inclination of the cutting edges of the implement and upon pushing or pulling the implement horizontally, the earth engaging corner portion engaged with the earth will bite and dig into the earth and effect desired cultivation or tilling thereof.

When the earth is hard and/or the work site is cramped, the sharper, narrower corner portions C are best used. When the earth is soft, the work site is uncrowded and large bits into the earth can be safely made, the corner portions C' are best utilized.

The distinction between the corner portions C and C' and the manner in which the implement is disposed to select and put those corner portions to use is made apparent by comparison of FIGS. 4 and 5 of the drawings.

While the corner portions C and C' are suitable for cultivating or tilling, they are equally suitable for digging below the surface of the soil and cutting the roots of weeds and the like. When engaged for this purpose, the implement can be manually swung in the manner that a hoe or axe might be swung to effect a chopping action for quick and deep penetration of the edges of the corner portions into the earth and into engagement with the root structures or the like to be cut.

It is to be particularly noted that the gardening implement that I provide is such that when the user becomes faimilar with the implement and proficient in using it, he can maneuver and reciprocate it rapidly about a work site and change its disposition from that disposition shown in FIG. 1 to that disposition shown in FIG. 2 and then back again by a turn of the wrist at the end of each stroke of the tool, if circumstances require. Such manipulation of the implement is most convenient and effective where one is weeding, cultivating and grading the soil about small closely related plants.

The guard plates 30 at the ends of the blades 20 enable the user of the implement to move the ends of the blades into juxtaposition with the base of plant stocks and to move the blade about the stocks to weed and cultivate, without the likelihood or chance that the end of the blade will cut, abrade or otherwise damage the stock of the plant.

Having described only one preferred form and carrying out of my invention, I do not wish to be limited to the specific details herein set forth, but wish to reserve to myself any modifications and/or variations that may appear to those skilled in the art and which fall within the scope of the following claims:

Having described my invention, I claim:

1. A garden implement including an elongate manually engageable handle with front and rear ends, a substantially Z-shaped working head and coupling means coupling the head with the front end of the handle, said head is a unitary part established of a single length of flat metal strap formed to establish a pair of flat, elongate, straight, parallel and laterally spaced blades, a flat, straight and elongate central member extending diagonally between and integrally joined with related ends of the blades at acute angle and cooperating therewith to define acute V-shaped corner portions; said head is on a plane normal to the longitudinal axis of the handle with the axis of the handle intersecting the member intermediate the ends thereof and with the planes of the blades and member parallel with the longitudinal axis of the handle, whereby said blades and member have straight, axially forwardly and rearwardly disposed work engaging edges.

2. The implement set forth in claim 1 which further includes flat, elongate, straight guard plates with forwardly and rearwardly disposed edges formed integrally with and projecting laterally inwardly from the ends of the blades remote from said member and cooperating therewith to define right angle V-shaped corner portions.

3. The implement set forth in claim 2 wherein the edges of the blades are sharpened.

4. The implement set forth in claim 2 wherein the edges of the blades and the portions of the edges of the member and the plates defining the corner portions are sharpened.

5. The implement set forth in claim 4 wherein said coupling means includes a longitudinally forwardly and radially outwardly opening slot in the front end portion of the handle slidably receiving the central portion of said member and a nut threaded on the handle forward of the member and engaging and holding said member in the slot.

6. The implement set forth in claim 1 wherein the edges of the blades are sharpened.

7. The implement set forth in claim 1 wherein the edges of the blades and the portions of the edges of said member defining said corner portions are sharpened.

8. The implement set forth in claim 1 wherein said coupling means includes a longitudinally forwardly and radially outwardly opening slot in the front end portion of the handle slidably receiving the central portion of said member and a nut threaded on the handle forward of the member and engaging and holding said member in the slot.

9. The implement set forth in claim 1 wherein the blades and member are less than two inches wide.

* * * * *